Figure 1:
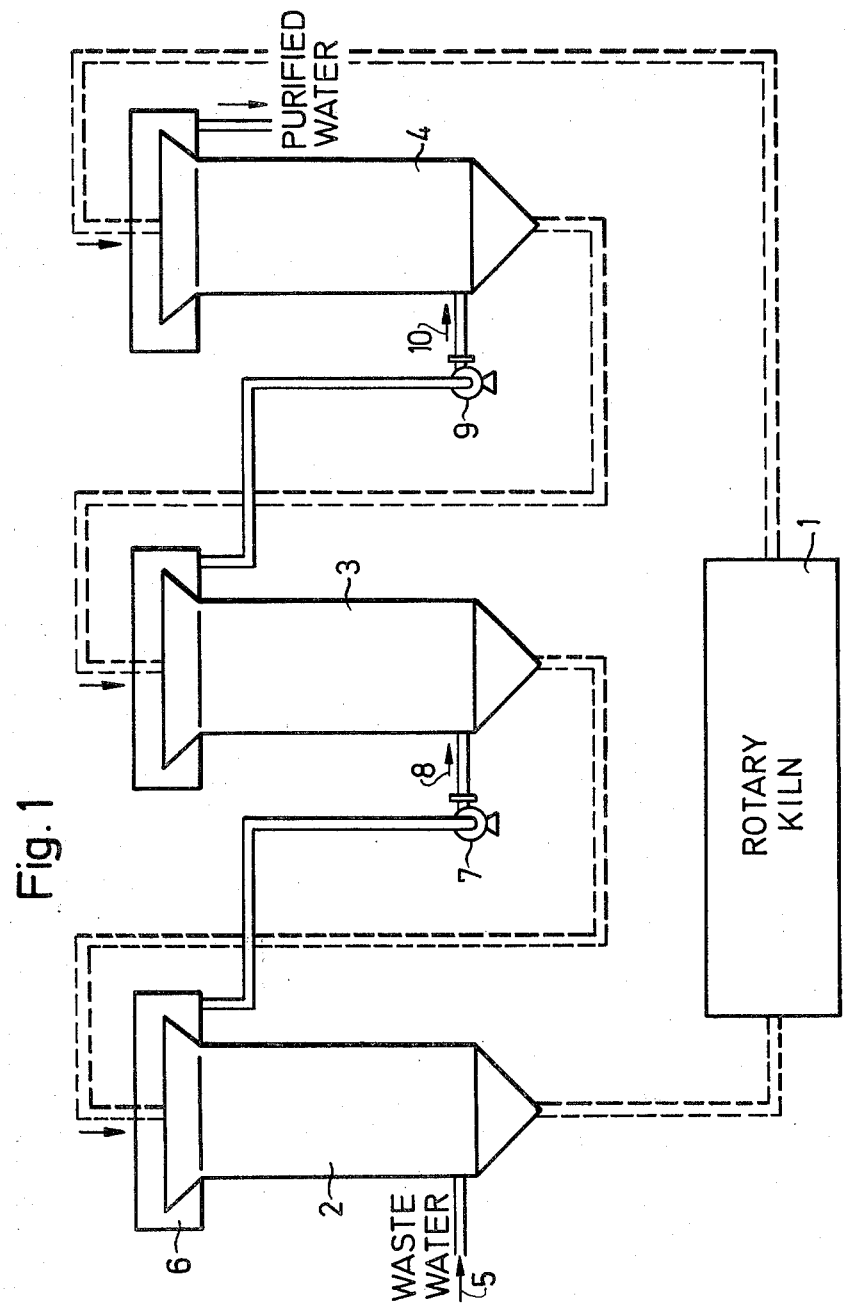

United States Patent [19]

Franzen et al.

[11] 3,998,731
[45] Dec. 21, 1976

[54] METHOD OF PURIFYING THE WASTE WATER OF PAPER MILLS

[75] Inventors: Volker Franzen, Heidelberg; Theodor Ploetz, Ratingen; Ursula Haupt; Edeltraud Solich, both of Viersen, all of Germany

[73] Assignee: Feldmuhle Anlagen- und Produktionsgesellschaft mit beschrankter Haftung, Duesseldorf-Oberkassel, Germany

[22] Filed: Apr. 10, 1975

[21] Appl. No.: 566,939

[30] Foreign Application Priority Data
Apr. 13, 1974 Germany ............................ 2418169

[52] U.S. Cl. .................................. 210/32; 210/40; 210/33; 162/29
[51] Int. Cl.² ........................................ B01D 15/06
[58] Field of Search ................. 210/32, 39, 40, 30, 210/24, 33; 162/29; 252/463

[56] References Cited
UNITED STATES PATENTS

| | | | |
|---|---|---|---|
| 3,346,336 | 10/1967 | Hayes | 252/463 |
| 3,625,886 | 12/1971 | Mattia | 210/40 |
| 3,763,040 | 10/1973 | Timpe et al. | 210/40 |

*Primary Examiner*—Charles N. Hart
*Assistant Examiner*—Benoit Castel
*Attorney, Agent, or Firm*—Hans Berman; Kurt Kelman

[57] ABSTRACT

The biochemical oxygen demand of waste water from paper mills containing lignin and other colloidally dispersed organic contaminants is sharply reduced by adsorption of the contaminants from the acidified waste water by granular alumina. The treatment is most effective at pH 2.5 and when the waste water is acidified with hydrochloric acid.

8 Claims, 2 Drawing Figures

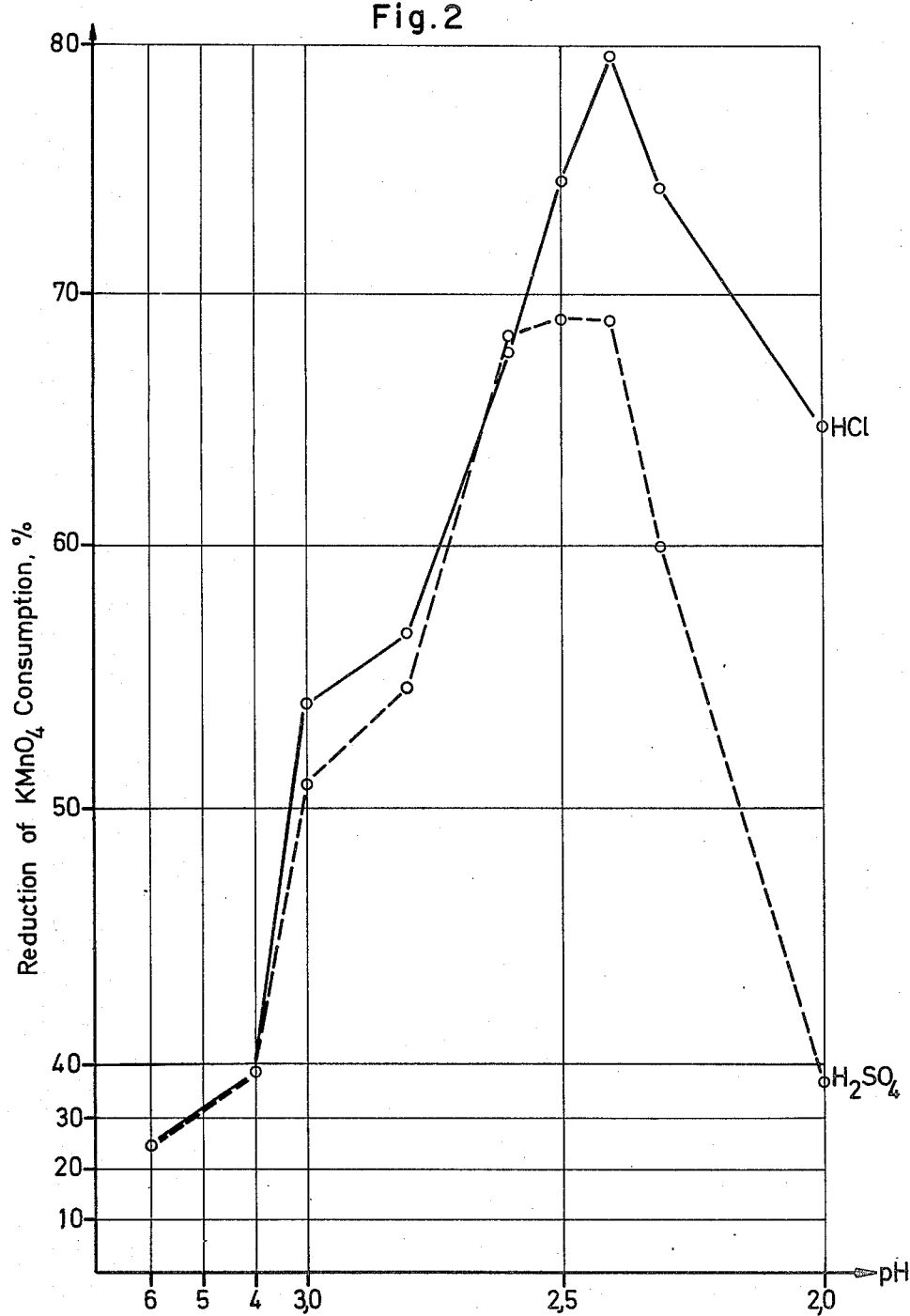

METHOD OF PURIFYING THE WASTE WATER OF PAPER MILLS

This invention relates to the purification of waste water contaminated with colloidal, oxygen-demanding organic substances, and particularly to a method of purifying the waste water of paper mills.

Purification of waste water has recently become one of the most pressing problems facing the manufacturers of cellulose, paper, cardboard, and the like. Conventional methods permit the removal of a major portion of the contaminants in the form of solid materials which may be burned under the factory boilers, but the effluent of the purification plants, considered satisfactory until recently, still contains organic materials as solutes or in colloidally dispersed form. The colloidal fraction of waste from cellulose plants mainly consists of lignin, hemicellulose and like polysaccharides which sharply increase the biochemical oxygen demand (B.O.D.) of open waters into which they are released. The contaminants from cellulose bleaching installations are similar in chemical nature and equally detrimental to the environment.

Because of their high B.O.D. values, the conventionally purified waste waters of the paper industry, a term employed herein to encompass the cellulose and cardboard industry, cannot be purified by the microorganisms naturally occurring in open streams and lakes, and they would destroy the microorganisms in a biological secondary treatment plant.

Attempts at removing colloidal organic contaminants from paper mill waste by adsorption on active carbon were unsatisfactory even after a conventional primary purification treatment.

In the commonly owned application Ser. No. 461,613, filed on Apr. 17, 1974, and now abandoned two of us disclosed that granular allumina is effective in adsorbing the colloidal, oxygen-demanding, organic impurities from paper mill waste water, γ-alumina activated to have an available surface area of more than 100 m²/g being preferred.

γ-Alumina of high specific surface area is obtained by precipitating aluminum hydroxide from aqueous solutions of aluminum salts, and heating the hydroxide to a temperature between 500° and 1100° C. Overheating is to be avoided to minimize the conversion of the γ-alumina to the less effective α-modification. However, the presence of some α-alumina does not interfere seriously with the adsorption properties of a product mainly consisting of the γ-modification.

The available surface area of γ-alumina does not even approach the surface area of a corresponding weight of active carbon. yet, in the removal of colloidal, oxygen-demanding organic impurities, granular alumina, when dispersed or suspended in the waste water, has been found to be surprisingly more effective than active carbon.

It has now been found that the colloidally dispersed polysaccharides and lignin which account for much of the B.O.D. of waste water from paper mills are adsorbed by granular alumina more effectively at a pH of 2.6 ± 0.4 than a higher or lower pH values, that best results are achieved at pH values of approximately 2.5, and that waste water acidified with hydrochloric acid loses more of its B.O.D. value under otherwise identical conditions than waste water acidified with sulfuric acid.

In the appended drawing:

FIG. 1 shows apparatus for purifying waste water from a paper mill according to this invention in elevation and partly by conventional symbols; and FIG. 2 diagrammatically illustrates the relationship between the pH value of waste water and the reduction of its potassium permanganate consumption by treatment with granular alumina.

The apparatus illustrated in FIG. 1 essentially consists of a rotary kiln 1 and three upright, generally cylindrical columns 2, 3, 4 having each an overflow trough 6 at its top and a conically tapering bottom equipped with a non-illustrated rotary valve. Acidulated waste water is continuously fed to the column 2 immediately above the conical bottom as indicated by an arrow 5 and rises in the column countercurrent to granular alumina fed to the top of the column from time to time. The partly purified liquid is transferred from the overflow trough of the column 2 to the bottom portion of the column 3 by a pump 7 as indicated by an arrow 8, and the overflow of column 3 is transferred to the bottom portion of the column 4 by a pump 9 in the direction of an arrow 10.

As shown by broken double lines, alumina freshly calcined in the rotary kiln 1 is fed to the top of the column 4 for contact with the waste water previously treated in columns 2, 3 so that purified water is discharged from the overflow trough of column 4. The alumina grains carrying some adsorbed impurities are withdrawn from the bottom valve of the column 4 and transferred to the top of the column 3. Similarly, alumina is withdrawn from the bottom of column 3 and fed to the top of column 2. The actual number of columns may be greater than three and is preferably chosen for each specific set of operating conditions in such a manner that the alumina withdrawn from the column receiving the most contaminated waste water has no further available adsorption capacity.

The spent alumina is regenerated in the kiln 1 in which the organic materials are burnt off at 500° – 600° C.

In an actual application of the invention to the purification of waste water from the chlorination stage of a sulfite cellulose factory employing coniferous wood as its raw material, the strongly colored waste water was strained to remove coarse particles. It then had a pH of 4.0 and consumed 2,280 mg $KMnO_4$ per liter. It was adjusted to pH 2.5 by continuous mixing with hydrochloric acid while being fed to the first of four series-connected columns of the type shown in FIG. 1.

Each column had a height of two meters and contained a layer of dry γ-alumina grains approximately 40 cm high in the absence of liquid flow through the column. During operation of the purification unit, the liquid rose in each column at a rate of 4.0 to 4.5 m/hour, whereby the bed of alumina grains was expanded to a height of approximately one meter, the top of the column being free of suspended adsorbent which had an average grain size of 80 microns. The time of contact between the waste water and the alumina suspended therein was thus approximately 15 minutes per column.

The water discharged from the fourth column was practically colorless and consumed only 160 mg $KMnO_4$ per liter, 93% of the biochemical oxygen demand having been removed by the adsorption treatment. No further reduction in the permanganate consumption could be achieved by additional treatment with suspended alumina. When an increase in the B.O.D. of the effluent from the last column was observed, the first column was taken out of service, the spent alumina was removed to the regenerating kiln and replaced by freshly regenerated absorbent. The column then was arranged last in the flow sequence. In this manner, each column advanced from the last step to the first step of the adsorption process and was recharged when its alumina had exhausted much or all of its adsorptive capacity.

The waste water which had been acidulated to pH 2.5 prior to being fed to the four-column unit had a pH value of slightly above 5 when discharged from the last column in purified condition. It still contained molecularly dissolved mono- and oligosaccharides. It was further adjusted to pH 7 with a small amount of sodium hydroxide and fed to a tertiary purification plant for microbial decomposition of the dissolved organic material.

When the strained waste water was fed to the same purification unit at its original pH of 4.0, adequate reduction of the B.O.D. value could not be achieved under conditions otherwise identical with those described above, and it was necessary to arrange eight columns of the same type in series flow to reduce $KMnO_4$ consumption to 550 mg/l, corresponding to a reduction of B.O.D. value by 76%. No further purification was possible by treatment with suspended alumina.

FIG. 2 shows the results of tests on a laboratory scale in which the waste water described above was adjusted to different pH values with hydrochloric acid or with sulfuric acid and then held in contact with granular aluminum oxide which had been used at pH 2.5 in the afore-described four-column unit and had been regenerated nine times at 600° C to volatilize the adsorbed organic material in the ambient, oxygen-bearing atmosphere. The alumina was kept suspended in the waste water by a stirrer at a rate of 20 grams per liter for 2 hours and was permitted to settle before the B.O.D. value of the supernatant was determined by titration with $KMnO_4$ in the usual manner.

As is evident from FIG. 2, the reduction in the $KMnO_4$ consumption accomplished by the batch operation is greatly affected by the initial pH of the aqueous waste material. For reasons not fully understood at this time, hydrochloric acid at equal pH is more effective than sulfuric acid. With both acids, best results are achieved at pH 2.5 ± 0.1, and good results between pH 2.2 and 3.0. The data of FIG. 2 have been duplicated closely in continuous operation in the purification unit of four columns described above.

When the waste water contains small amounts of dissolved silicates, the capacity of the alumina for adsorbing colloidal contaminants from the paper mill waste is impaired and is not restored by the thermal regeneration which removes the organic material. Alumina employed for purifying the aforedescribed waste water, which contained an amount of silicate acceptable in drinking water, lost about 90% of its adsorptive capacity after 20 cycles of adsorption and thermal regeneration when the waste water was treated at its initial pH of 4.

Under conditions closely similar to those described with reference to FIG. 2, two batches of the waste water employed in the operations described above were adjusted to pH 2.5 with hydrochloric acid and sulfuric acid respectively. γ-Alumina received from a commercial source as "activated alumina" was suspended in waste water from each of the two batches and an untreated control for two hours in an amount of 20 grams per liter.

The alumina then was separated from the treated waste water, calcined at 600° C to constant weight, and thereafter suspended in more of the previously employed aqueous material. The reduction of the initial $KMnO_4$ consumption in the waste water treated with the fresh alumina and with alumina that had been regenerated 9, 14, and 22 times was determined and is listed in the following Table.

TABLE

| Alumina regen'd | Reduction in $KMnO_4$ consumption, percent | | |
|---|---|---|---|
| | pH 4.0 | pH 2.5 (HCl) | pH 2.5 ($H_2SO_4$) |
| 0 | 47 | 74 | 61 |
| 9× | 25 | 79 | 69 |
| 14× | 17 | 73 | 65 |
| 22× | 5 | 68 | 61 |

As is evident from the above data, the pH adjustment of the waste water almost eliminates the unfavorable effects of silicates in the treated water, hydrochloric acid being significantly more effective than sulfuric acid. The improvement observed after nine cycles at pH 2.5 is believed due to incomplete activation of the alumina as received from the supplier.

While the differences between the effects of hydrochloric and sulfuric acid have not yet been elucidated, the major effects of this invention do not depend on the specific chemical nature of the acid employed for pH adjustment as is evident from laboratory tests with other mineral acids, including hydrobromic, nitric, fluoboric, and phosphoric acid, and strong organic acids such as trichloroacetic acid. For use on an industrial scale, only hydrochloric and sulfuric acid are economically acceptable. No relevant differences have been observed between the chemically pure, reagent grade acids and commercial or technical grades. The concentration of the acid employed for lowering the pH of the waste water is irrelevant and will normally be selected according to cost and availability.

Waste water of the same origin was employed in the several operations described hereinabove for the convenience of direct comparison, but the same relationship of pH and B.O.D. improvement was found when the treated waste water came from other stages of cellulose manufacture, from paper mills employing hard wood as the principal source of cellulose, and from plants making cardboard from wood products. Except for the described effects of silicates, other normal constituents of spring water in the waste material had no measurable influence on the method of the invention. It must be assumed, therefore, that pH affects the surface of the practically anhydrous alumina and has no direct bearing on the chemical nature of the organic waste material. While lignin and hemicelluloses are the principal contaminants of the paper mill waste, other contaminants are present in colloidally dispersed from and are removed simultaneously together with at least a portion of the oligosaccharides and other molecularly dissolved compounds, the remainder being amenable to microbial decomposition or even permissible to be discharged into rivers and other surface water.

Granular alumina having a particle size of 80 microns is commercially available and suitable for the purpose of this invention under many conditions. However, coarser and finer grains may be used to suit specific operating conditions, particularly the means available for separating the adsorbent carrying the contaminants from the purified water. It is cheap to suspend the alumina grains in the liquid by the upward flow of the liquid. The relationship between the grain size or settling velocity of the adsorbent, the linear upward velocity of the liquid, and the dimensions of the apparatus are readily selected to combine spontaneous separation of alumina and treated water with the largest possible interface of the solid and liquid phases. Grains smaller than 30 microns, however, are useful in few types of equipment. Stationary packed columns of alumina grains are less desirable than freely suspended granular alumina because of the smaller available surface of the grains and the tendency of such columns to be clogged by residual, relatively coarse suspended matter.

What is claimed is:
1. A method of purifying waste water of oxygen-demanding, organic contaminants including lignin, said waste water being an effluent from a paper or cellulose mill, which method comprises:
   a. contacting granular, activated γ-alumina with said waste water at pH 2.2 to 3.0 until said contaminants are adsorbed on said alumina; and
   b. separating the waste water thereby purified from the alumina having said contaminants adsorbed thereon.

2. A method as set forth in claim 1, wherein said alumina has an average grain size greater than 30 microns.
3. A method as set forth in claim 1, wherein the pH of said waste water prior to said contacting is higher than 3.0, and is adjusted to 2.2 – 3.0 by adding to said waste water a mineral acid selected from the group consisting of hydrochloric acid and sulfuric acid.
4. A method as set forth in claim 3, wherein said mineral acid is hydrochloric acid.
5. A method as set forth in claim 3, wherein said separated alumina is regenerated by heating the same in an oxygen-bearing atmosphere until said adsorbed contaminants are volatilized.
6. A method as set forth in claim 5, wherein said regenerated alumina is contacted with an additional amount of said waste water at said pH until said contaminants in said additional waste water are adsorbed on said regenerated alumina.
7. A method as set forth in claim 1, wherein said pH is $2.5 \pm 0.1$.
8. A method as set forth in claim 1, wherein said granular alumina is contacted with said waste water by suspending particles of said alumina in said waste water.

* * * * *